(12) United States Patent
Kazaoka et al.

(10) Patent No.: US 12,294,290 B2
(45) Date of Patent: May 6, 2025

(54) CONTROLLER FOR POWER CONVERTER

(71) Applicant: DENSO CORPORATION, Kariya (JP)

(72) Inventors: Ryoya Kazaoka, Kariya (JP); Yusuke Shindo, Kariya (JP); Shunichi Kubo, Kariya (JP); Ken Toshiyuki, Kariya (JP)

(73) Assignee: DENSO CORPORATION, Kariya (JP)

( * ) Notice: Subject to any disclaimer, the term of this patent is extended or adjusted under 35 U.S.C. 154(b) by 43 days.

(21) Appl. No.: 18/372,307

(22) Filed: Sep. 25, 2023

(65) Prior Publication Data

US 2024/0030803 A1 Jan. 25, 2024

Related U.S. Application Data

(63) Continuation of application No. PCT/JP2022/011097, filed on Mar. 11, 2022.

(30) Foreign Application Priority Data

Mar. 30, 2021 (JP) .................................. 2021-058794

(51) Int. Cl.
*H02M 1/14* (2006.01)
*B60L 15/00* (2006.01)
(Continued)

(52) U.S. Cl.
CPC .............. *H02M 1/14* (2013.01); *B60L 15/007* (2013.01); *B60L 58/16* (2019.02); *H02J 7/0047* (2013.01);
(Continued)

(58) Field of Classification Search
CPC ....... H02M 1/14; H02M 7/5395; H02P 21/22; H02P 27/08; B60L 58/16; B60L 15/007; B60L 2210/40; H02J 7/0047
See application file for complete search history.

(56) References Cited

U.S. PATENT DOCUMENTS 6,078,163 A 6/2000 Horie et al.
11,673,542 B2 * 6/2023 Hagimoto ................ B60K 6/28
701/22

(Continued)

FOREIGN PATENT DOCUMENTS

JP H10-132182 A 5/1998
JP 2002-067891 A 3/2002
(Continued)

*Primary Examiner* — Jared Fureman
*Assistant Examiner* — Duc M Pham
(74) *Attorney, Agent, or Firm* — Oliff PLC

(57) ABSTRACT

A power converter has a capacitor and a power conversion unit having a series-connected unit composed of an upper arm side switching element and a lower arm side switching element. The capacitor is connected in parallel with the serios connection unit. The power conversion unit supplies electric power to a motor. A controller for the power conversion unit has a frequency characteristics estimation part estimating frequency characteristics of a battery current of the battery when a current is flowing between the power convertor and the battery, a ripple current setting part determining a ripple frequency of a ripple current contained in the battery current based on the frequency characteristics of the battery current, and a control part performing a switching control of the switching elements based on the ripple frequency in order to generate the ripple current.

18 Claims, 10 Drawing Sheets

(51) Int. Cl.
*B60L 58/16* (2019.01)
*H02J 7/00* (2006.01)
*H02M 7/5395* (2006.01)
*H02P 21/22* (2016.01)
*H02P 27/08* (2006.01)

(52) U.S. Cl.
CPC .......... *H02M 7/5395* (2013.01); *H02P 21/22* (2016.02); *B60L 2210/40* (2013.01); *H02P 27/08* (2013.01)

(56) References Cited

U.S. PATENT DOCUMENTS

| | | | |
|---|---|---|---|
| 2011/0025240 A1* | 2/2011 | Furukawa | H02M 7/5395 318/400.3 |
| 2015/0365040 A1 | 12/2015 | Saha et al. | |
| 2015/0372598 A1* | 12/2015 | Akiyama | H02M 3/285 363/17 |
| 2016/0105120 A1* | 4/2016 | Hirano | H02M 3/33584 363/17 |
| 2017/0294863 A1 | 10/2017 | Takahashi et al. | |
| 2021/0175780 A1* | 6/2021 | Sano | H02K 3/28 |
| 2021/0384786 A1* | 12/2021 | Tamura | H02K 11/33 |

FOREIGN PATENT DOCUMENTS

| | | |
|---|---|---|
| JP | 2010-272395 A | 12/2010 |
| JP | 2015-149853 A | 8/2015 |
| WO | 2019/230157 A1 | 12/2019 |

\* cited by examiner

CONTROLLER FOR POWER CONVERTER

CROSS-REFERENCE TO RELATED APPLICATION

This application is the U.S. bypass application of International Application No. PCT/JP2022/011097 filed on Mar. 11, 2022, which designated the U.S. and claims priority to Japanese Patent Application No. 2021-058794 filed on Mar. 30, 2021, the contents of both of which are incorporated herein by reference.

TECHNICAL FIELD

The present disclosure relates to controllers for power converter.

BACKGROUND

Because input output power reduction occurs in batteries mounted on vehicles at a low temperature under a cold environment, a known battery is equipped with a mechanism for raising a temperature of the battery so as to avoid this drawback (for example, see JP 2010-272395 A.)

SUMMARY

A controller for a power converter as one aspect of the present disclosure has a power conversion unit and a capacitor. The controller for the power converter further has a frequency characteristics estimation part, a ripple current setting part and a control part. The power conversion unit has series-connected units and a capacitor. Each of the series-connected units is composed of an upper arm side switching part and a lower arm side switching part. The power conversion unit performs a switching control to convert a direct current power supplied from a battery to an alternating current power, and supplies the alternating current power to windings of a rotating electric machine. The capacitor is connected in parallel with the series-connected unit. The frequency characteristics estimation part estimates frequency characteristics of a battery current flowing in the battery when a current flows between the power converter and the battery. The ripple current estimation part sets a ripple frequency of a ripple current contained in the battery current. The control part performs a switching control of the upper arm side switching parts and the lower arm side switching parts so as to generate the ripple current based on the ripple frequency determined by the ripple current setting part.

BRIEF DESCRIPTION OF THE DRAWINGS

The above features of the present disclosure will be made clearer by the following detailed description, given referring to the appended drawings. In the accompanying drawings.

DETAILED DESCRIPTION OF THE PREFERRED EMBODIMENTS

Figure 1:
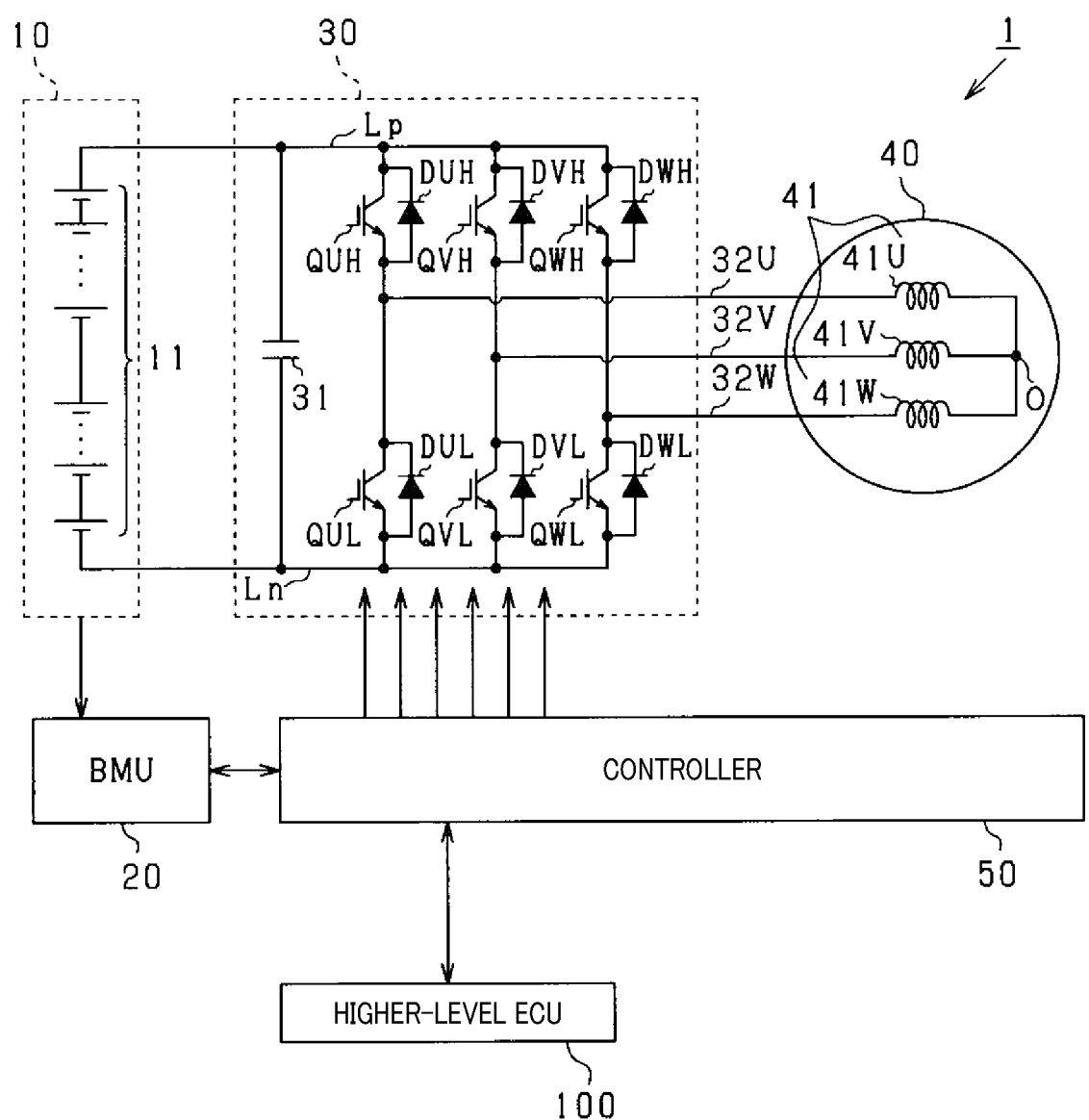
FIG. 1 is a configuration diagram of a drive system.

JP 2010-272395 A discloses a mechanism of superimposing a higher harmonic wave (a ripple current) on a battery current so as to increase an internal resistance of the battery. This mechanism easily and quickly increases a power consumption due to the increased internal resistance so as to raise a temperature of the battery.

Because the conventional mechanism previously described is designed without considering any circuit characteristics, there is still room for improvement in the temperature rise capability of the battery.

The present disclosure has been made in consideration of the foregoing circumstances, and it is an object of the present disclosure to provide a controller for a power converter having the ability of quickly raising the temperature of a battery.

A controller for a power converter as one aspect of the present disclosure has a power conversion unit and a capacitor. The controller for the power converter further has a frequency characteristics estimation part, a ripple current setting part and a control part. The power conversion unit has series-connected units and a capacitor. Each of the series-connected units is composed of an upper arm side switching part and a lower arm side switching part. The power conversion unit performs a switching control to convert a direct current power supplied from a battery to an alternating current power, and supplies the alternating current power to windings of a rotating electric machine. The capacitor is connected in parallel with the series-connected unit. The frequency characteristics estimation part estimates frequency characteristics of a battery current flowing in the battery when a current flows between the power converter and the battery. The ripple current estimation part sets a ripple frequency of a ripple current contained in the battery current. The control part performs a switching control of the upper arm side switching parts and the lower arm side switching parts so as to generate the ripple current based on the ripple frequency determined by the ripple current setting part.

The present disclosure has recognized that a magnitude of the battery current varies in response to the ripple frequency of the ripple current based on circuit characteristics of a circuit composed of an inverter, the capacitor and the windings of the rotating electric machine when a temperature of the battery rises by the ripple current flowing between the rotating electric machine and the capacitor or between the capacitor and the battery through the power conversion unit. The control part determines the ripple frequency of the ripple current based on the frequency characteristics of the battery current specified by the frequency characteristics estimation part, and the control part performs the switching control so as to generate the ripple current having the determined ripple frequency. This control makes it possible for the control part to determine the optimal ripple frequency of the ripple current in consideration of the circuit characteristics and possible to enhance the temperature rise capability of the battery for quickly raising the temperature of the battery. In addition, because the controller for the power converter according to the present disclosure uses the rotating electric machine, the power conversion unit and the capacitor, this structure makes it possible to miniaturize the overall size of the controller when compared with a controller having additional circuits.

First Embodiment

Next, a description will be given of a controller for a power converter applied to vehicles (for example, hybrid vehicles, electric vehicles) according to preferred embodiments of the present disclosure with reference to figures. In the following description, the same components and equivalents thereof between the preferred embodiments will be referenced with the same reference numbers and characters, and the explanation of the same components is omitted for brevity.

As shown in FIG. 1, a vehicle is equipped with a drive system 1 with a battery 10, a BMU 20 (Battery management unit), an inverter 30 as a power conversion unit, a motor 40 as a rotating electric machine, a controller 50, a higher-level ECU 100, etc.

For example, the battery 10 has a terminal voltage across its terminals more than one hundred volts. The battery 10 is composed of a plurality of battery cells 11 connected in parallel, or connected in series. It is acceptable to use, as the battery cells 11, lithium-ion batteries, and nickel metal hydride batteries.

The BMU 20 supervises the state of the battery 10, and performs the charging and discharging control of the battery 10. In more detail, the BMU 20 detects the terminal voltage of the battery 10, a SOC (a state of charge of the battery), a SOH and a temperature of the battery 10. The BMU 20 instructs the battery 10 to charge and supply (to discharge) the electric power.

The inverter 30 performs a bidirectional power conversion between the battery 10 and the motor 40 in accordance with control signals transmitted from the controller 50. For example, the inverter 30 converts a direct current power supplied from the battery 10 to an alternating current power, and supplies the alternating current power to the motor 40 so as to drive the motor 40. Further, the inverter 30 converts the alternating current power supplied from the motor 40 to the direct current power, and supplies the direct current power to the battery 10. As not shown in the figure, it is acceptable to arrange a converter between the battery 10 and the inverter 30.

The inverter 30 has three phase direct connection units composed of upper arm side switching elements QUH, QVH and QWH and lower arm side switching elements QUL, QVL and QWL. In the present embodiment, each of the switching elements QUH, QVH, QWH, QUL, QVL and QWL is composed of a semiconductor switching element of a voltage-controlled type. Specifically, each of the switching elements is composed of an IGBT and a MOS-FET. Diodes DUH, DVH, DWH, DUL, DVL and DWL are connected as a freewheeling diode in reverse parallel to the respective switching elements QUH, QVH, QWH, QUL, QVL and QWL.

A lower voltage potential terminal of the U phase upper arm side switching element QUH and a higher voltage potential terminal of the U phase lower arm side switching element QUL are connected to a first terminal of the U phase winding 41U of the motor 40 through a U phase conductive material 32U such as a bus bar. A lower voltage potential terminal of the V phase upper arm side switching element QVH and a higher voltage potential terminal of the V phase lower arm side switching element QVL are connected to a first terminal of the V phase winding 41V of the motor 40 through a V phase conductive material 32V such as a bus bar. A lower voltage potential terminal of the W phase upper arm side switching element QWH and a higher voltage potential terminal of the W phase lower arm side switching element QWL are connected to a first terminal of the W phase winding 41W of the motor 40 through a W phase conductive material 32W such as a bus bar. A second terminal of each of the U phase winding 41U, the V phase winding 41V and the W phase winding 41W is connected to a neutral point O. In the present embodiment, the phase windings 41U, 41V and 41W have the same turn number. This makes it possible for each of the phase windings 41U, 41V and 41W to have the same inductance.

The higher voltage potential terminal of each of the upper arm side switching elements QUH, QVH and QWH is connected to a positive electrode terminal of the battery 10 through a positive electrode line Lp such as a bus bar. The lower voltage potential terminal of each of the lower arm side switching elements QUL, QVL and QWL is connected to a negative electrode terminal of the battery 10 through a negative electrode line Ln such as a bus bar.

The inverter 30 is equipped with a smoothing capacitor 31 through which the positive electrode line Lp and the negative electrode line Ln are connected together. It is acceptable for the inverter 30 to have a built-in smoothing capacitor. In the present embodiment, the inverter 30 and the smoothing capacitor 31 form the power converter.

The motor 40 is an alternating current rotating electric machine such as a three-phase alternating current synchronous rotating machine in which permanent magnets are embedded in a rotor. The motor 40 has the U phase winding 41U, the V phase winding 41V and the W phase winding 41W which form the stator windings in a star connection. These respective phase windings 41U, 41V and 41W are arranged at the electrical angle of 120° C. The inverter 30 drives the motor 40, and the motor 40 generates a rotation drive power, and transmits the generated rotation drive power to the wheels of a vehicle. Further, the motor 40 operates as a power generator to generate regenerative power during braking of the vehicle. The motor 40 provides the regenerative power to the battery 10 through the inverter 30 so as to charge the battery 10.

The controller 50 is equipped with a microcomputer composed of a CPU and various types of memories, and performs a feedback control of each of the switching elements forming the inverter 30 based on detection information transmitted from the motor 40. That is, the controller 50 performs the feedback control of the detection information as control target values so that the motor 40 works based on instruction values. The controller 50 uses torque information as one of the control target values. For example, the detection information includes a rotation angle θ of a rotor detected by an angular detector (as a rotation sensor 42) such as a revolver, a power source voltage (as an inverter input voltage) detected by a voltage sensor, and phase current detection values Iu, Iv and Iw of the three phases detected by phase current sensors 43 to 45. The controller 50 performs the switching control such as the PWM control of the switching elements at a predetermined frequency (a carrier frequency).

The controller 50 communicates with the BMU 20. Further, the controller 50 communicates the higher-level ECU 100 located outside. The higher-level ECU 100 supervises the control of the vehicle.

The controller 50 has a memory device, and performs programs stored in the memory device so as to realize the various types of control functions. It is acceptable to use electronic circuits to execute these control functions, and also possible to use both the electronic circuits and programs so as to executes these control functions.

A description will now be given of the drive control of the motor 40 performed by the controller 50. During the driving (also at the start of the driving), a motor torque instruction control part 101 in the higher-level ECU 100 transmits a torque instruction value Tr to a motor current instruction control part 51 in the controller 50 so as for the motor 40 to generate a torque in accordance with a depression amount of the accelerator and a vehicle speed. The motor current instruction control part 51 determines a d-axis current instruction value Id* as a current instruction value in the d axis and a q axis current instruction value Iq* as a current instruction value in the q axis based on the torque instruction value Tr and a torque-dq map. The motor current instruction control part 51 transmits the d-axis current instruction value Id* and the q axis current instruction value Iq* to respective comparators 52 and 53. In the d axis and the q axis in the rotating orthogonal coordinate, the d axis corresponds to the field direction of permanent magnets forming the rotor, and the q axis is orthogonal to the q axis.

A three phase-two phase conversion part 57 converts the phase current detection values Iu, Iv and Iw detected by the respective phase current sensors 43 to 45 to d axis current Id and q axis current Iq as components in the rotating orthogonal coordinate, in which the d axis corresponds to the field direction, based on the rotation angle θ of the rotor transmitted from the rotation sensor 42. The three phase-two phase conversion part 57 transmits the d axis current Id and q axis current Iq as the detected d axis and q axis current Id and Iq to the respective comparators 52 and 53.

The comparator 52 compares the detected d axis current Id with the d axis current instruction value Id*. That is, the comparator 52 calculates a difference between the detected d axis current Id and the d axis current instruction value Id*, and transmits the difference (as a deviation) to a current control part 54. Similarly, the comparator 53 compares the detected q axis current Iq with the q axis current instruction value Iq*. That is, the comparator 53 calculates a difference between the detected q axis current Iq and the q axis current instruction value Iq*, and transmits the difference (as a deviation) to the current control part 54.

For example, the current control part 54 performs a proportional integration operation (PI calculation) of a d axis voltage instruction value Vd* and a q axis voltage instruction value Vq* based on the received deviations so that the d axis current Id becomes equal to the d axis current instruction value Id* and the q axis current Iq becomes equal to the q axis current instruction value Iq*. The current control part 54 transmits the d axis voltage instruction value Vd* and the q axis voltage instruction value Vq* to a two-phase to three-phase conversion part 55.

The two-phase to three-phase conversion part 55 converts the d axis voltage instruction value Vd* and the q axis voltage instruction value Vq* to U phase instruction voltage Vu, V phase instruction voltage Vv and W phase instruction voltage Vw on the three phase alternating current coordinate based on the rotation angle θ of the rotor transmitted from the rotation sensor 42. The two-phase to three-phase conversion part 55 transmits the U phase instruction voltage Vu, the V phase instruction voltage Vv and the W phase instruction voltage Vw to a PWM wave generation part 56.

The PWM wave generation part 56 performs the switching control of each of the switching elements in the inverter 30 based on the U phase instruction voltage Vu, the V phase instruction voltage Vv and the W phase instruction voltage Vw, and the PWM wave generation part 56 generates PWM wave signals Pu, Pv and Pw (voltage instruction value signals).

The switching control of the inverter 30 is executed based on the PWM wave signals. That is, the inverter 30 converts a direct current power supplied from the battery 10 to an alternating current power, and supplies the alternating current power to each of the phases of the motor 40. This control makes it possible to drive the motor 40 in response to the torque instruction value Tr. During the regenerative power generation, the inverter 40 converts the alternating current power generated by the motor 40 to the direct current power, and supplies the direct current power to the battery 10.

As previously described, a PWM control part 59 is composed of the motor current instruction control part 51, the comparators 52 and 53, the current control part 54, the two-phase to three-phase conversion part 55, the PWM wave generation part 56 and the three phase-two phase conversion part 57. That is, the control part 59 generates the control signals, based on the torque instruction value Tr, etc., and transmits the control signals to the inverter 30. The PWM control part 59, In particular, the motor current instruction control part 51 corresponds to the control part. A switch control part is composed of the comparators 52 and 53, the current control part 54, the two-phase to three-phase conversion part 55, the PWM wave generation part 56 and the three phase-two phase conversion part 57. The switch control part performs the switching control based on the d axis current instruction value and the q axis current instruction value.

A description will now be given of the temperature rise control of the battery 10 performed by the controller 50. The controller 50 detects for every predetermined control period whether a temperature rise request for the battery 10 occurs. For example, when the controller 50 detects whether the higher-level ECU 100 transmits the temperature rise instruction of the battery 10. When detecting that the higher-level ECU 100 transmits the temperature rise instruction of the battery 10, or when detecting that the battery temperature detected by the BMU 20 is less than a threshold temperature (for example, −20° C.), the controller 50 detects that the temperature rise request for the battery 10 occurs. It is acceptable for the controller 50 to use the lowest temperature in the detected temperature of the battery cells 11, and also to use an average temperature of the detected temperature of the battery cells 11.

In the present embodiment, it is acceptable for the controller to receive the temperature rise request when the vehicle stops before start of the motor 40, or when the motor 40 is driven, i.e., when the vehicle is running.

When receiving no temperature rise request, the controller 50 completes the temperature rise control, and performs the usual drive control of the motor 40. On the other hand, when receiving the temperature rise request, the controller 50 performs the temperature rise control for raising the temperature of the battery 10. A description will now be given of the temperature rise control according to the present disclosure. When performing the temperature rise control in the present embodiment, the controller 50 instructs the inverter 30 to superimpose a higher harmonic wave on the alternating current power when the inverter 30 converts the direct current power to the alternating current power. That is, when the higher harmonic wave superimposed on the alternating current power is also superimposed on a current flowing in the battery 10 (hereinafter, referred to as the battery current), and this generates a ripple current. Because the ripple current flowing in the battery 10 increases the internal resistance of the battery 10 and enhances the power consumption of the internal resistance, heat energy occurs in the battery 10. This raises a temperature of the battery 10.

Figure 3:
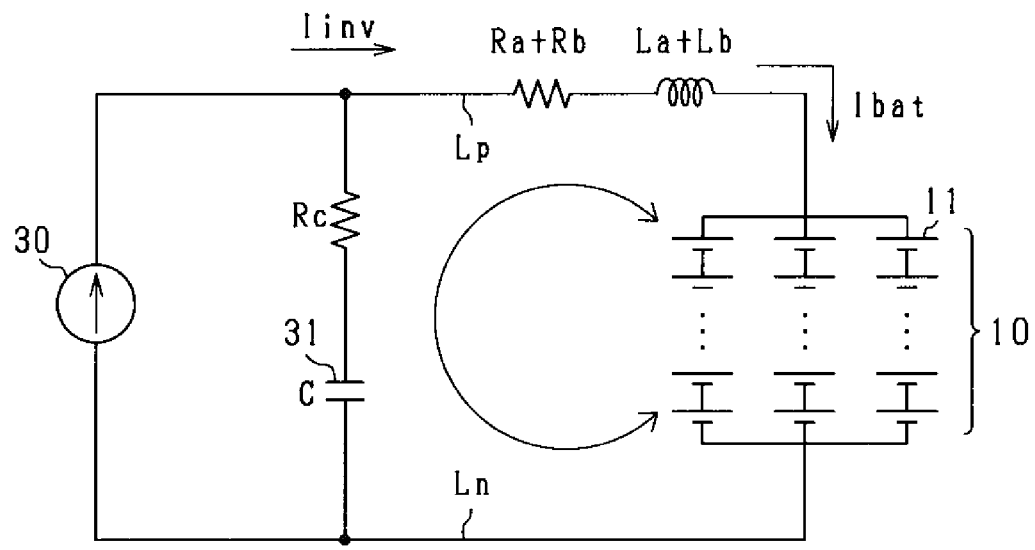
FIG. 3 is a view explaining a resonance between a battery 10 and a smoothing capacitor 31.

The present disclosure recognizes that the amplitude of the ripple current varies in response to the frequency of the ripple current and the magnitude of the ripple current relates to the power consumption of the battery 10. A description will now be given of this knowledge in more detail. FIG. 3 shows an equivalent circuit composed of the battery 10, the smoothing capacitor 31 and the inverter 30, which perform the temperature rise control.

In FIG. 3, the inverter 30 corresponds to a current source, and reference symbol Iinv indicates an inverter current. Reference symbol C indicates a capacitance of the smoothing capacitor 31, and Rc indicates an internal resistance of the smoothing capacitor 31. Reference symbol Rb indicates the internal resistance of the battery 10, Lb indicates a parasitic inductance in the battery 10, and Tbat indicates the battery current flowing in the battery 10. Reference symbol Ra indicates a parasitic resistance of busbars Lp and Ln, and La indicate a parasitic inductance of the busbars Lp and Ln.

As shown in FIG. 3, it can be understood that the ripple current resonates between the smoothing capacitor 31 and the battery 10. This resonance amplifies the amplitude of the frequency of the ripple current. It is possible to use the following equations (1) and (2) in order to calculate the frequency (as the resonance frequency f) of the inverter current providing the maximum amplitude of the ripple current flowing in the battery 10.

[Math. 1]

$$\left|\frac{Ibat}{Iinv}\right| = \sqrt{\frac{Rc^2 + \left(\frac{1}{\omega C}\right)^2}{(Ra+Rb+Rc)^2 + \left\{\omega(La+Lb) - \frac{1}{\omega C}\right\}^2}} \quad (1)$$

$$f = \frac{1}{2\pi\sqrt{(La+Lb)C}}\sqrt{1 - \frac{(Ra+Rb+Rc)^2}{2(La+Lb)}} \quad (2)$$

The present disclosure further recognizes that the amplitude of the ripple current can be amplified by the resonance between the smoothing capacitor 31 and the winding 41 of the motor 40 (the U phase winding 41U, the V phase winding 41V and the W phase winding 41W). In more detail, it is possible to provide a circuit model composed of the battery 10, the smoothing capacitor 31 and the inverter 30 shown in FIG. 4.

Figure 4:
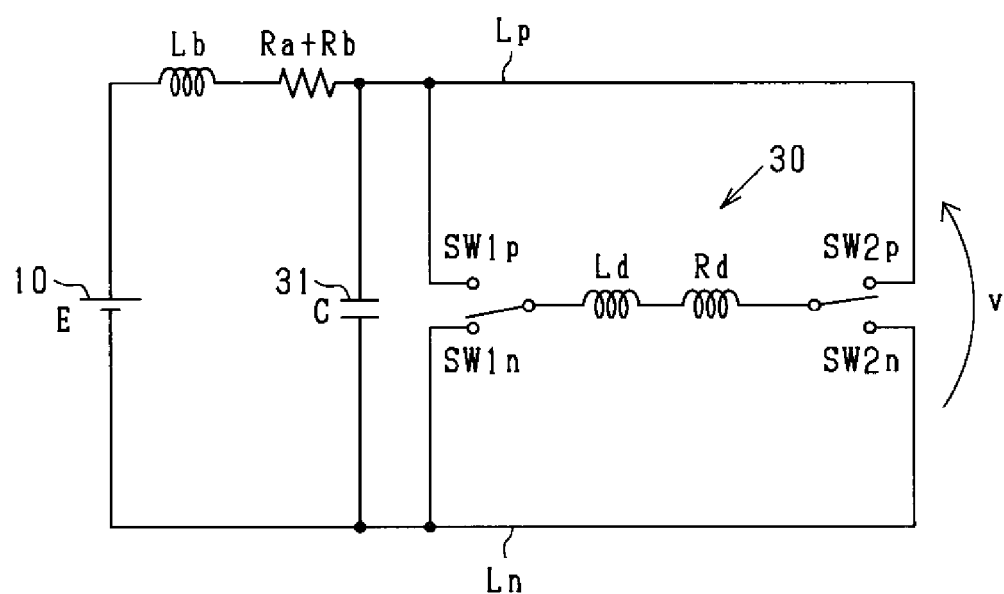
FIG. 4 is a view showing a circuit model composed of the battery 10, the smoothing capacitor 31 and an inverter 60.

In the circuit model shown in FIG. 4, reference symbol E indicates the voltage across the terminals of the battery 10, and Ra indicates a parasitic resistance of the bus bars Lp and Ln. Reference symbol Rb indicates an internal resistance of the battery 10, and Lb indicates a parasitic inductance in the battery 10. Reference symbol v indicates the voltage of the smoothing capacitor 31, and C indicates the capacitance of the smoothing capacitor 31. Reference symbol Ld indicates a d axis inductance of the winding 41, and Rd indicates a winding resistance. The switching element SW1$p$ corresponds to one of the switching elements QUH, QVH and QWH, and the switching element SW2$p$ corresponds to one of the switching elements QUH, QVH and QWH, excepting for the switching element SW1$p$. Similarly, the switching element SW1$n$ corresponds to one of the switching elements QUL, QVL and QWL, and the switching element SW2$n$ corresponds to one of the switching elements QUL, QVL and QWL, except for the switching element SW1$n$. The inverter 30 operates at the angular frequency $\omega$ within 180° under the power control so as for the ripple current to have the maximum amplitude. In this case, the circuit equation is expressed by the following equation (3), and $\omega_0$ and $\gamma$ in the equation (3) are expressed by the equations (4) and (5).

[Math. 2]

$$\frac{d^2}{dt^2}v + 2\gamma\frac{d}{dt}v + \omega_0^2 v = \frac{4E}{\pi LDC}\sin(\omega t) + \omega_0^2 E \quad (3)$$

$$\omega_0 = \sqrt{\frac{Rd}{LdC(Ra+Rb)}} \quad (4)$$

$$\gamma = \frac{1}{2C(Ra+Rb)} - \frac{Rd}{2Ld} \quad (5)$$

Because the circuit equation previously described is a differential equation with attenuation, the circuit equation provides the maximum amplitude when the following equation (6) is satisfied. The frequency f when this circuit equation provides the maximum amplitude is expressed by the following equation (7). Actually, there is a high possibility of using a value near the maximum frequency f due to the presence of error.

[Math. 3]

$$\gamma < \frac{\omega_0}{\sqrt{2}} \quad (6)$$

$$f = \frac{1}{2\pi}\sqrt{\omega_0^2 - 2\gamma^2} \quad (7)$$

In addition, the present disclosure recognizes that the magnitude of the internal resistance of the battery 10 varies due to the frequency of the ripple current. Accordingly, the present disclosure determines the frequency and amplitude of the ripple current and generates the ripple current so as to increase the power consumption based on these characteristics previously described. A description will now be given of the temperature rise control in detail.

Figure 2:
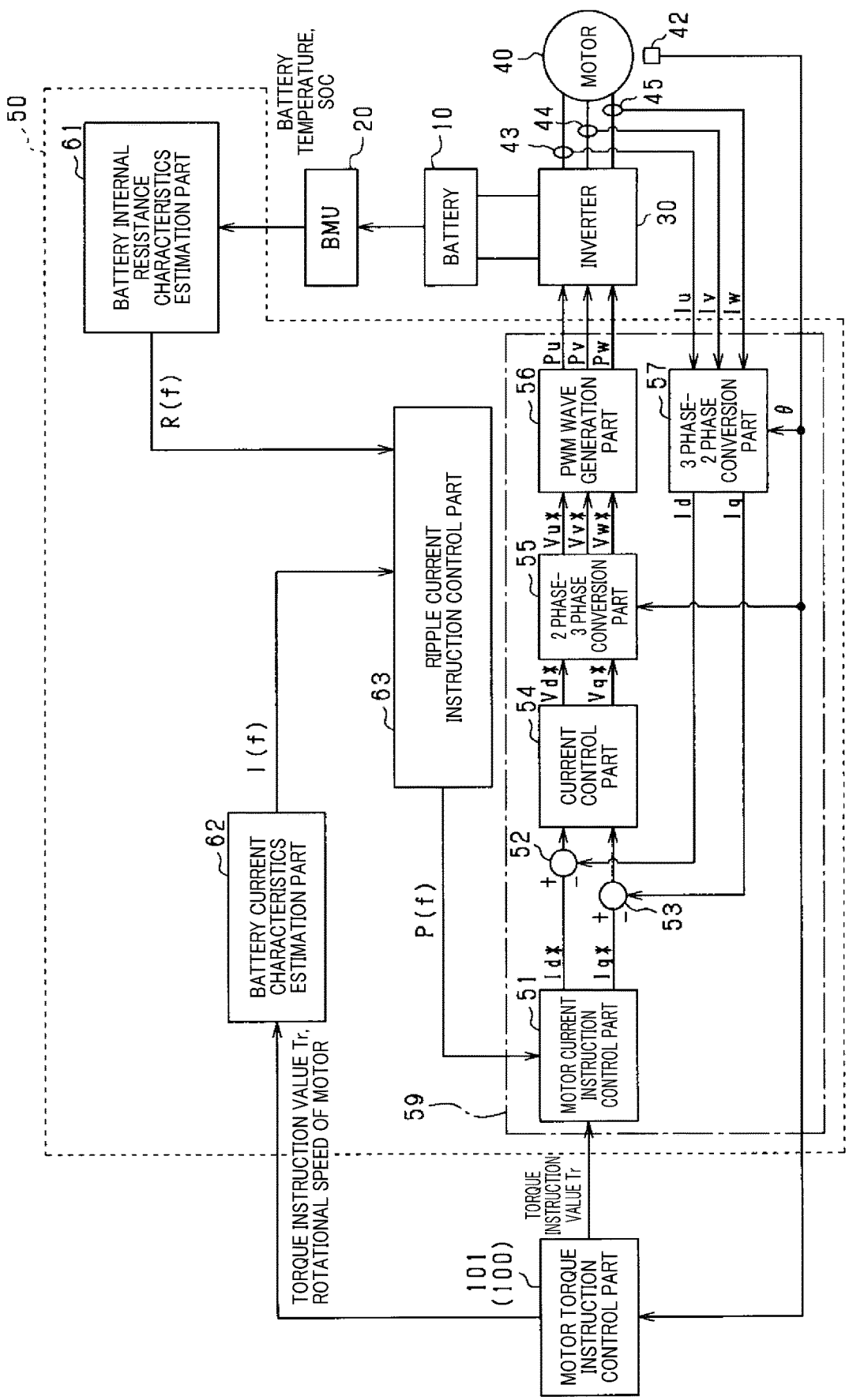
FIG. 2 is a functional block diagram showing a control process performed by a controller 50.

As shown in FIG. 2, the controller 50 has a battery internal resistance characteristics estimation part 61, a battery current characteristics estimation part 62 and a ripple current instruction control part 63, and the controller 50 generates an optimum ripple current.

Figure 5:
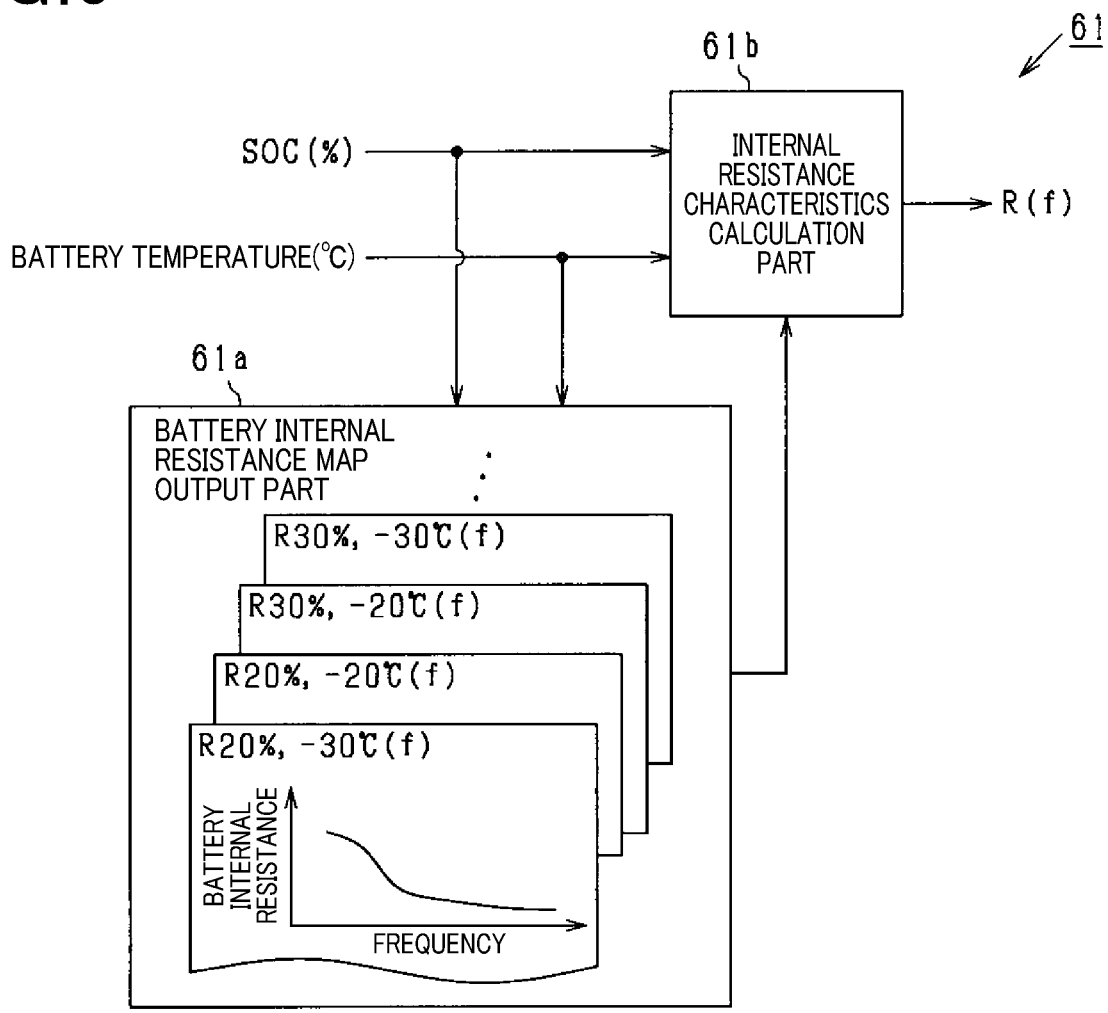
FIG. 5 is a functional block diagram showing a process performed by a battery internal resistance characteristics estimation part 61.

The battery internal resistance characteristics estimation part 61 corresponds to an internal resistance estimation part for estimating the internal resistance of the battery 10. As shown in FIG. 5, the battery internal resistance characteristics estimation part 61 has a battery internal resistance map output part 61a and an internal resistance characteristics calculation part 61b. The battery internal resistance characteristics estimation part 61 is connected to the BMU 20, and receives information regarding a SOC (%) and a battery temperature (° C.) of the battery 10 transmitted from the BMU 20.

Figure 6:
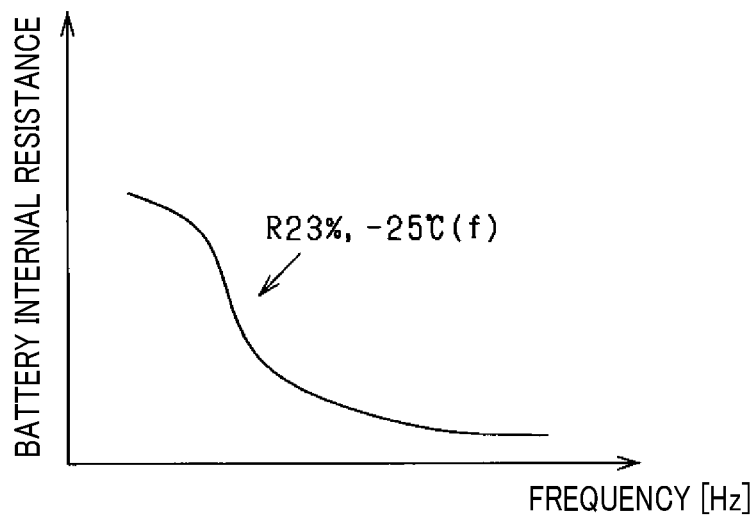
FIG. 6 is a view showing an example of a battery internal resistance map.

The battery internal resistance map output part 61a stores a battery internal resistance map R(f), shown in FIG. 6, which shows a relationship between the internal resistance of the battery 10 and the frequency of the ripple current (which contains in the battery current). Hereinafter, the frequency of the ripple current is also referred to as the ripple frequency only. The relationship between the internal resistance of the battery 10 and the ripple frequency varies due to the SOC of the battery 10 and the temperature of the battery 10. For this reason, battery internal resistance map output part 61a stores a map group having a plurality of the battery internal resistance maps R(f) showing the internal resistance frequency characteristics of the battery 10 for every combination between the SOC of the battery and the temperature of the battery 10.

When receiving the information regarding the SOC of the battery 10 and the temperature of the battery 10, the battery internal resistance map output part 61a selects several maps R(f) from the BMU 20, closest to the combination of the received SOC and the temperature of the battery 10. The battery internal resistance map output part 61a transmits the selected map to the internal resistance characteristics calculation part 61b.

For example, when the received SOC is 23% and the received temperature is −25° C., the battery internal resistance map output part 61a selects several maps, i.e., selects the battery internal resistance map R(f) in which the SOC of the battery 10 is 20% and the temperature of the battery 10 is −20° C., selects the battery internal resistance map R(f) in which the SOC of the battery 10 is 20% and the temperature of the battery 10 is −30° C., selects the battery internal resistance map R(f) in which the SOC of the battery 10 is 30% and the temperature of the battery 10 is −20° C., and also selects the battery internal resistance map R(f) in which the SOC of the battery 10 is 30% and the temperature of the battery 10 is −30° C. The battery internal resistance map output part 61a transmits the selected maps to the internal resistance characteristics calculation part 61b. In FIG. 5, R(f) indicates the battery internal resistance maps. FIG. 5 shows the combination of the SOC and the temperature of the battery.

The internal resistance characteristics calculation part 61b performs a two-dimensional linear interpolation based on the received battery internal resistance maps R(f), and estimates the battery internal resistance map R(f) closest to the currently received SOC and the temperature of the battery 10 based on the result of the two-dimensional linear interpolation. The battery internal resistance characteristics estimation part 61 transmits the estimated battery internal resistance map R(f) to the ripple current instruction control part 63.

As shown in FIG. 6, the battery internal resistance map R(f) has a feature in which the internal resistance increases according to the reduction of the frequency of the ripple current, and the internal resistance is reduced according to the increase of the frequency of the ripple current. As previously described, the present disclosure provides an example of the combination of the SOC and the temperature of the battery. It is acceptable for the battery internal resistance characteristics estimation part 61 to store the battery internal resistance maps R(f) corresponding to various combinations of the SOC and the temperature of the battery 10. It is also acceptable to change the total number of the battery internal resistance maps R(f). The present disclosure selects a plurality of the battery internal resistance maps R(f), and estimates (i.e., generates) the battery internal resistance map R(f) based on the selected maps. However, the concept of the present disclosure is not limited by this example. It is acceptable to select only a battery internal resistance map R(f) corresponding to the combination which is closes to the combination of the received SOC and the temperature of the battery 10. That is, it is acceptable for the present disclosure to eliminate the internal resistance characteristics calculation part 61b performing the two-dimensional linear interpolation from the battery internal resistance characteristics estimation part 61. It is also acceptable to change the total number of the selected battery internal resistance maps R(f).

Figure 7:
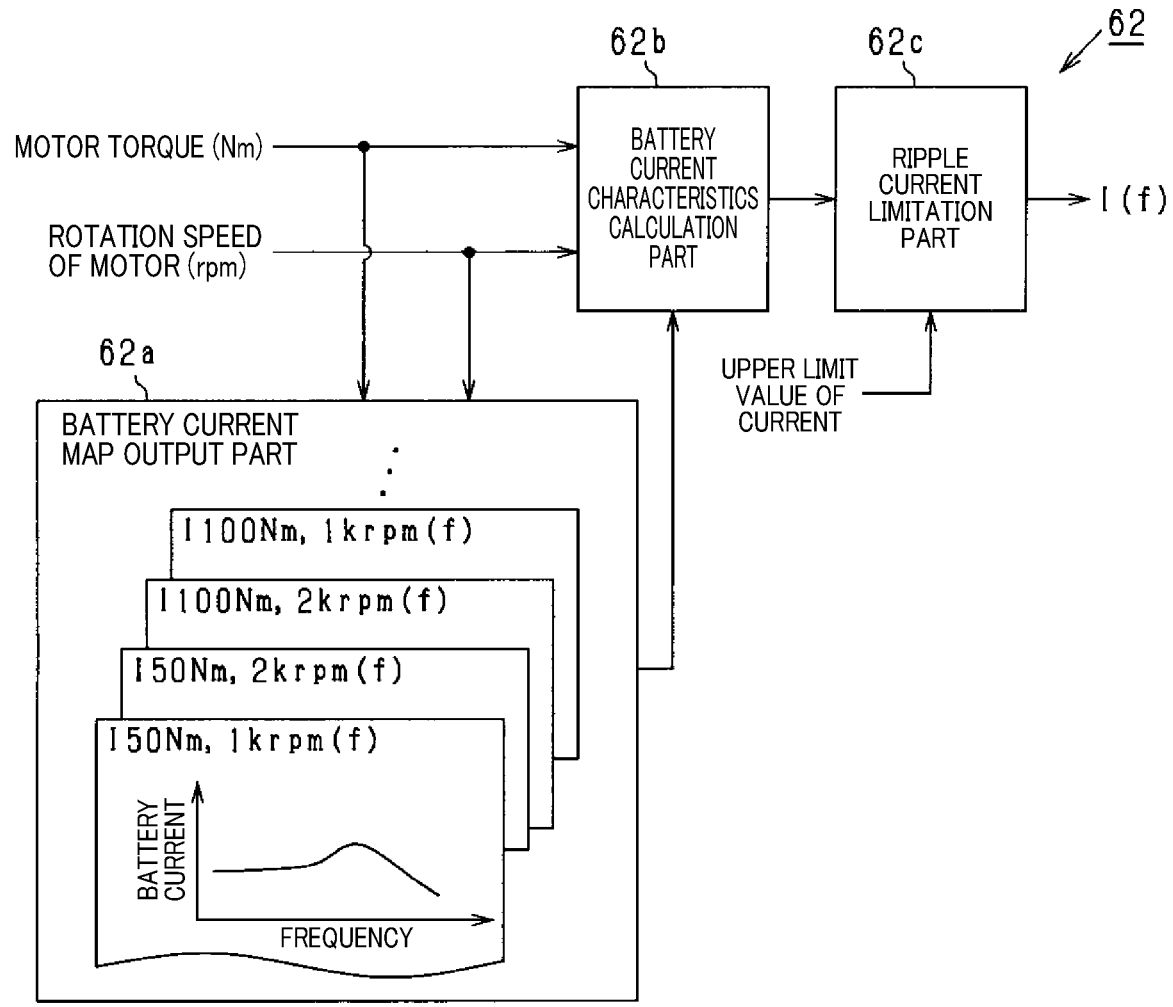
FIG. 7 is a functional block diagram showing a process performed by a battery current characteristics estimation part 62.

The battery current characteristics estimation part 62 corresponds to the frequency characteristics estimation part for estimating the frequency characteristics of the battery current. As shown in FIG. 7, the battery current characteristics estimation part 62 has a battery current map output part 62a, a battery current characteristics calculation part 62b, and a ripple current limitation part 62c. The battery current characteristics estimation part 62 is connected to the higher-level ECU 100. The battery current characteristics estimation part 62 is configured to receive a torque instruction value Tr and a rotational speed (rpm) of the motor transmitted from the higher-level ECU 100.

Figure 8:
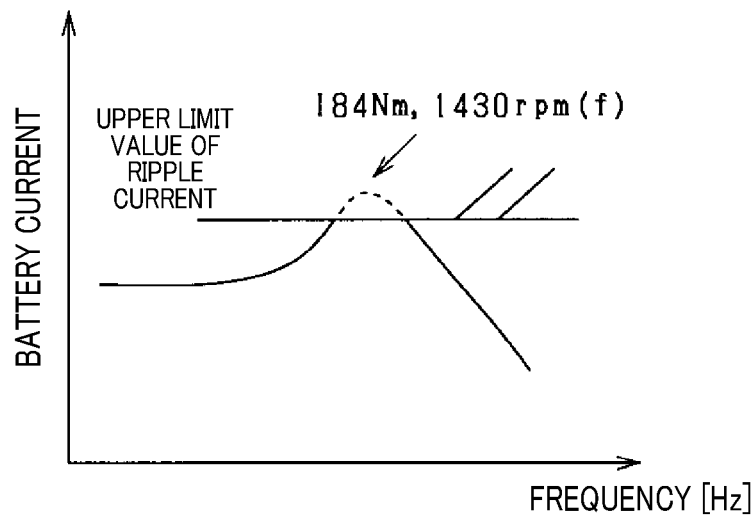
FIG. 8 is a view showing an example of a battery current map.

The battery current map output part 62a stores the battery current map I(f) showing a relationship between the battery current of the battery 10 and the ripple frequency shown in FIG. 8. Accordingly, the battery current map output part 62a corresponds to the current map storage part. The relationship between the battery current and the ripple frequency varies due to a motor torque corresponding to the torque instruction value Tr and a rotational speed of the motor. Accordingly, the battery current map output part 62a stores a plurality of the battery current maps I(F) showing the frequency characteristics of the battery current for every combination of the motor torque and the rotational speed of the motor.

When receiving the information of the torque instruction value Tr and the rotational speed of the motor, the battery current map output part 62a selects several battery current maps I(f) closest to the combination of the motor torque and the rotational speed of the motor corresponding to the torque instruction value Tr. The battery current map output part 62a transmits the selected battery current maps I(f) to the battery current characteristics calculation part 62b.

For example, when receiving the torque instruction value Tr of 84 Nm, and the torque instruction value Tr of 1430 rpm, the battery current map output part 62a selects the battery current map I(f) when the torque instruction value Tr of 50 Nm, and the rotational speed of 1 krpm, the battery current map I(f) when the torque instruction value Tr of 50 Nm, and the rotational speed of 2 krpm, the battery current map I(f) when the torque instruction value Tr of 100 Nm, and the rotational speed of 1 krpm, and the battery current map I(f) when the torque instruction value Tr of 100 Nm, and the rotational speed of 2 krpm. The battery current map output part 62a transmits the selected maps to the battery current characteristics calculation part 62b. In FIG. 7, reference symbol I(f) indicates the selected battery current map showing a combination of the motor torque and the rotational speed of the motor.

The battery current characteristics calculation part 62b performs a two-dimensional linear interpolation based on the received battery current maps I(f), and estimates the battery current map I(f) closest to the currently received motor torque and the rotational speed of the motor based on the result of the two-dimensional linear interpolation. Accordingly, the battery current characteristics calculation part 62b corresponds to the current characteristics calculation part. The battery current characteristics estimation part 62 transmits the estimated battery current map I(f) to the ripple current limitation part 62c.

In general, the battery current map I(f) has a tendency in which the battery current has the maximum value at a frequency around a specific frequency (i.e., around the resonance frequency). As previously described, the present disclosure provides an example of the combination of the motor torque and the rotational speed of the motor. It is acceptable for the battery current map output part 62a to store the battery current maps I(f) corresponding to various combinations of the motor torque and the rotational speed of the motor. It is also acceptable to change the total number of the battery current maps I(f). The present disclosure selects a plurality of the battery current maps I(f), and generates the battery current map I(f) based on the selected maps. However, the concept of the present disclosure is not limited by this example. It is acceptable to select only the battery current map I(f) corresponding to the combination which is closest to the combination of the motor torque and the rotational speed of the motor corresponding to the received torque instruction value Tr. That is, it is acceptable for the present disclosure to eliminate the battery current characteristics calculation part 62b performing the two-dimensional linear interpolation from the battery current characteristics estimation part 62. It is also acceptable to change the total number of the selected battery current maps I(f).

The ripple current limitation part 62c receives the upper limit value of the ripple current, and determines the upper limit value of the battery current in the battery current map I(f) shown in FIG. 8. The upper limit value of the ripple current has been determined based on the standard of the battery 10 and the inverter 30, and stored. The ripple current limitation part 62c transmits the battery current map I(f) having the upper limit value of the battery current to the ripple current instruction control part 63.

Figure 9:
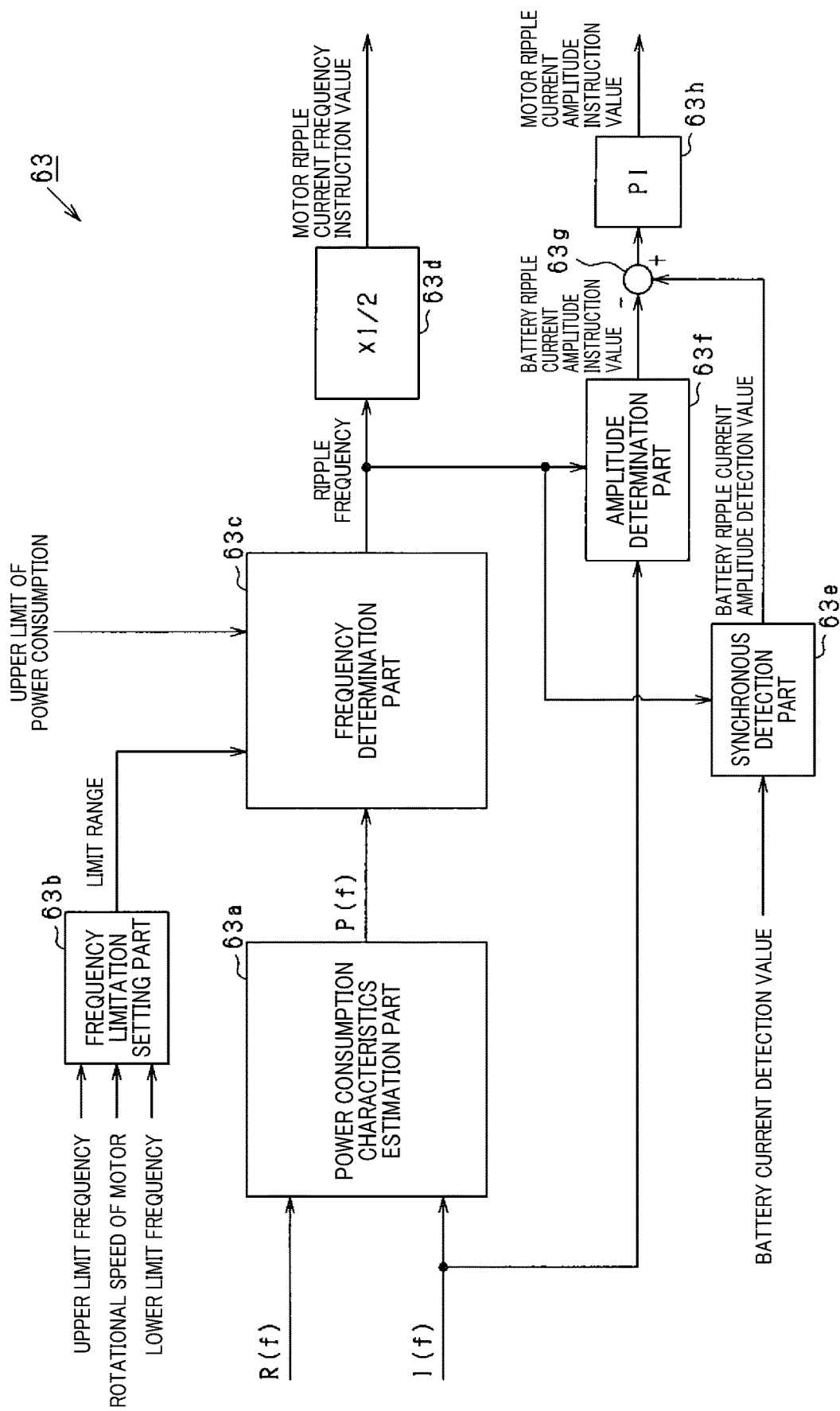
FIG. 9 is a functional block diagram showing a process performed by a ripple current instruction control part 63.

A description will now be given of the ripple current instruction control part 63 with reference to FIG. 9. The ripple current instruction control part 63 corresponds to the ripple current setting part which determines the ripple frequency as the frequency of the ripple current based on the battery current frequency characteristics and the internal resistance of the battery 10. The ripple current instruction control part 63 has a power consumption characteristics estimation part 63a, a frequency limitation setting part 63b, a frequency determination part 63c, a frequency instruction value setting part 63d, a synchronous detection part 63e, an amplitude determination part 63f, a comparison part 63g, and an amplitude instruction value setting part 63h.

Figure 10A:
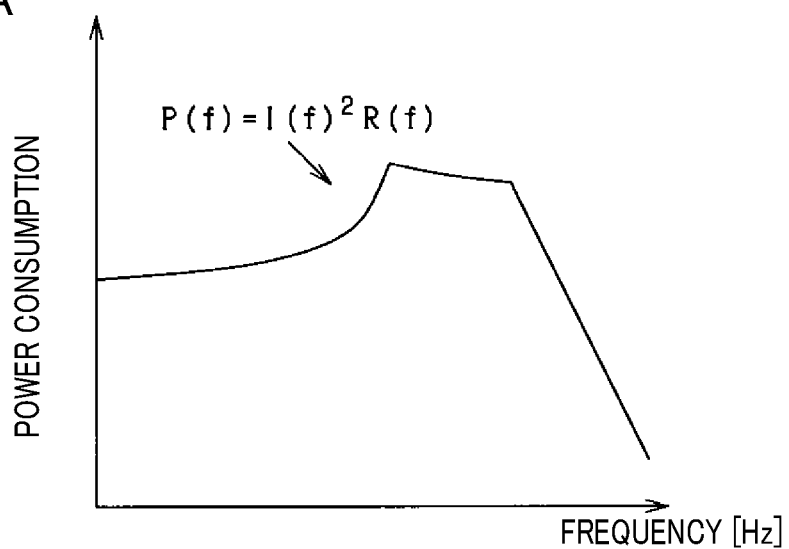
FIGS. 10A and 10B are views showing an example of a power consumption characteristics maps.

The power consumption characteristics estimation part 63a receives the battery internal resistance map R(f) transmitted from the battery internal resistance characteristics estimation part 61 and the battery current map I(f) transmitted from the battery current characteristics estimation part 62. The power consumption characteristics estimation part 63a determines a power consumption of the internal resistance of the battery 10 and a power consumption characteristics map P(f) by using the equation (8) based on the received battery internal resistance map R(f) and the received battery current map I(f). The power consumption characteristics map P(f) shows a relationship between the ripple current, and the power consumption based on the internal resistance of the battery 10. FIG. 10(a) shows an example of the power consumption characteristics map P(f).

[Math. 4]

$$P(f)=I(f)^2 R(f) \tag{8}$$

The frequency limitation setting part 63b receives the upper limit frequency, the lower limit frequency and the rotational speed of the motor, and determines an allowable limit range (hereinafter, referred to as the limit range) as the ripple frequency. The upper limit frequency indicates the limit value where the magnitude of operation noise of the motor 40 and the inverter 30 does not exceed a predetermined limit level. That is, when the frequency limitation setting part 63b determines the ripple frequency of more than the upper limit frequency, there is a possibility to occur noise of more than the predetermined limit level. In order to avoid this, the present disclosure uses the upper limit frequency. The upper limit frequency has been determined based on the mechanical characteristics of the motor 40, etc. For example, the predetermined value as the upper limit frequency has been stored in a memory device, and the frequency limitation setting part 63b reads it from the memory device, and obtains the upper limit frequency. The lower limit frequency has been determined so as to avoid deterioration of the battery 10. For example, when the ripple current having a frequency of less than the lower limit frequency is generated under cold environments, there is a possibility to deposit Lithium in the lithium-ion battery. In order to avoid this deposition, data regarding the lower limit frequency has been determined and stored in the memory device. The frequency limitation setting part 63b reads it from the memory device so as to obtain the lower limit frequency.

When an integer order component of a basic wave frequency becomes equal to the ripple frequency at the start of the motor 40, there is a possibility to cause an excessive ripple current. In order to avoid this, the frequency limitation setting part 63b determines a limit range of the ripple frequency based on the received rotational speed of the motor transmitted from the higher-level ECU 100, etc. so as to limit the ripple frequency having the same integer order component of the basic wave frequency. The frequency limitation setting part 63b transmits the limit range of the ripple frequency determined based on the upper limit frequency, the lower limit frequency and the rotational speed of the motor to the frequency determination part 63c.

Figure 10B:
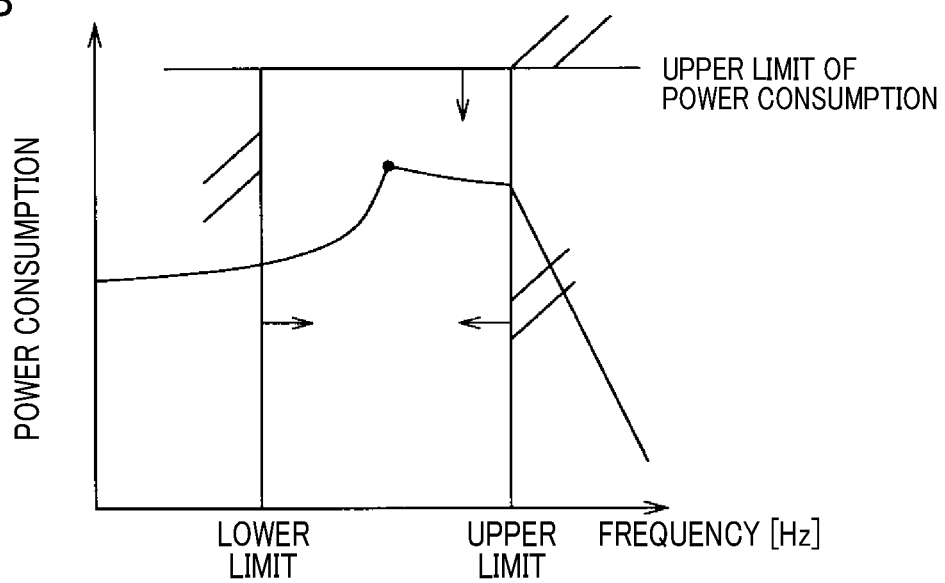

The frequency determination part 63c receives the limit range of the ripple frequency and the upper limit of the power consumption, and determines an allowable setting range of the ripple frequency based on the received data, as shown in FIG. 10(b). The upper limit of the power consumption has been determined based on the battery standard and stored in the memory device. The frequency determination part 63c determines a ripple frequency range for increasing the power consumption, as compared when the ripple frequency is zero that is, compared when no ripple current flows, based on the received power consumption characteristics maps P(f) within the allowable setting range of the ripple frequency. In the present embodiment, the frequency determination part 63c determines the ripple frequency at the maximum power consumption, and transmits the determined ripple frequency to the frequency instruction value setting part 63d.

The frequency instruction value setting part 63d receives data regarding the ripple frequency transmitted from the frequency determination part 63c, and multiplies the received ripple frequency with a predetermined coefficient (½) while considering the current commutation of the inverter 30. This makes it possible for the frequency instruction value setting part 63d to generate a motor ripple current frequency instruction value as the frequency instruction value of the ripple current (as the higher harmonic wave to be superimposed on the alternating current power as the inverter current) to be generated in the motor 40. The frequency instruction value setting part 63d transmits the generated motor ripple current frequency instruction value to the motor current instruction control part 51. In a case where no current commutation to be considered, for example, when no d axis current and q axis current across the positive and negative areas, it is acceptable for the frequency instruction value setting part 63d to use the predetermined coefficient of 1 because the period of the ripple current to be generated in the motor 40 becomes equal to the period of the ripple current on the battery current.

The synchronous detection part 63e performs the synchronous detection based on the battery current detection value as the detection value of the battery current detected by a current sensor (not shown), and extracts a battery ripple current amplitude detection value as a component of the ripple frequency component of the battery current, i.e., as the amplitude of the ripple current. The synchronous detection part 63e transmits the battery ripple current amplitude detection value to the comparison part 63g.

The amplitude determination part 63f calculates the component of the ripple frequency of the battery current based on the ripple frequency transmitted from the frequency determination part 63c while referring the battery current map I(f). That is, the amplitude determination part 63f generates a battery ripple current amplitude instruction value representing the amplitude of the ripple current in the battery current.

The comparison part 63g compares the battery ripple current amplitude detection value with the battery ripple current amplitude instruction value, and transmits a difference (deviation) between them to the amplitude instruction value setting part 63h.

The amplitude instruction value setting part 63h performs, for example, the proportional integration operation (PI calculation) of a motor ripple current amplitude instruction value indicating the amplitude (which is a higher harmonic wave to be superimposed on the alternating current power as the inverter current) of the ripple current to be generated in the motor 40, so that the battery ripple current amplitude detection value becomes equal to the battery ripple current amplitude instruction value. The amplitude instruction value setting part 63h transmits the motor ripple current frequency instruction value to the motor current instruction control part 51.

Figure 11:
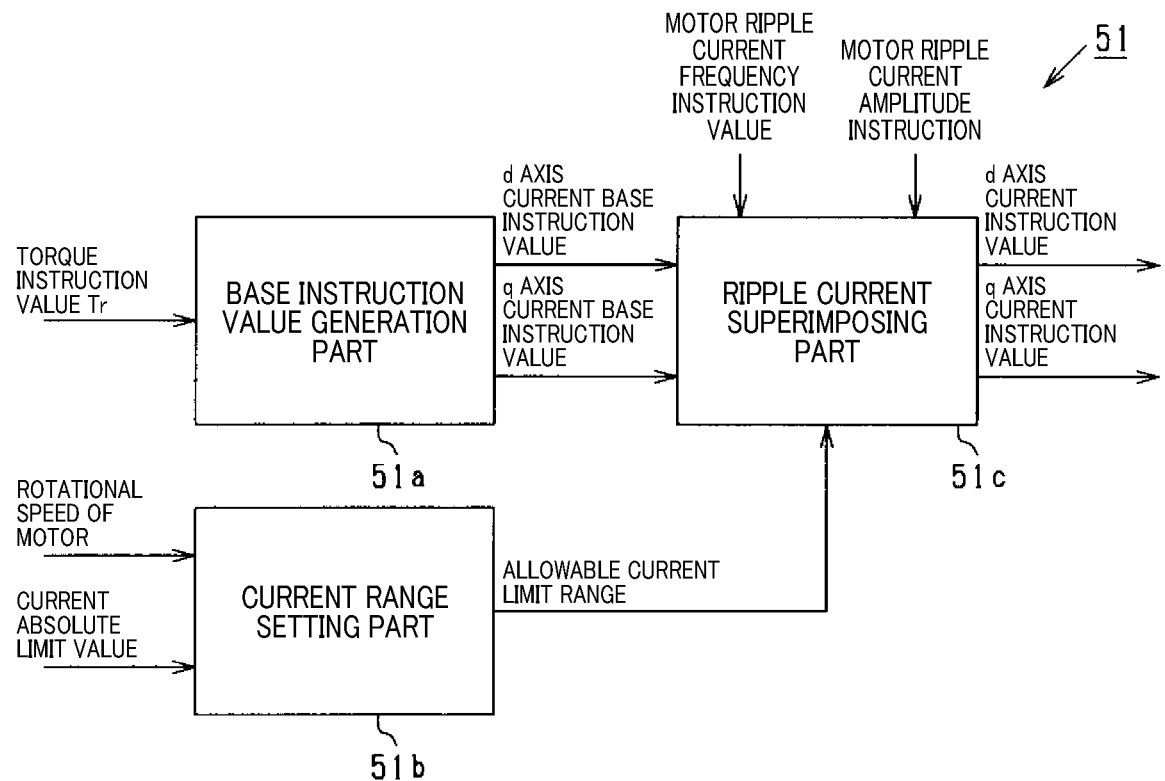
FIG. 11 is a functional block diagram showing a process performed by a motor current instruction control part 51.

Next, a description will now be given of the structure of the motor current instruction control part 51 for superimposing the ripple current (as the higher harmonic wave). As shown in FIG. 11, the motor current instruction control part 51 has a base instruction value generation part 51a as the axis current instruction part, a current range setting part 51b and a ripple current superimposing part 51c as the current superimposing part.

Figure 12A:
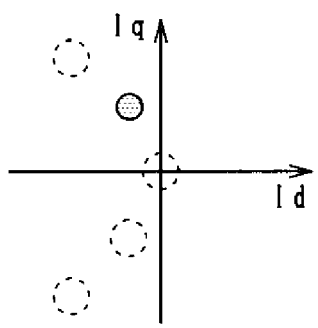
FIGS. 12A, 12B and 12C are views explaining the determination of operation points in d-q axis.
Figure 12B:
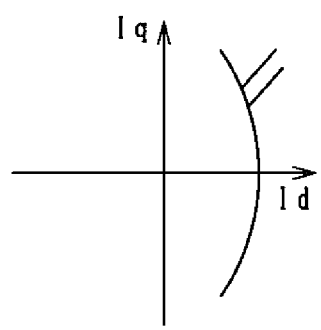

The base instruction value generation part 51a receives the torque instruction value Tr, and determines the d axis current base instruction value and the q axis current base instruction value which correspond to the received torque instruction value Tr while referring the torque-dq map, as shown in FIG. 12(a). The current range setting part 51b receives the rotational speed of the motor and a current absolute limit value, and determines the allowable setting range of the d axis current and the q axis current based on the received rotational speed of the motor and the current absolute limit value, as shown in FIG. 12(b).

Figure 12C:
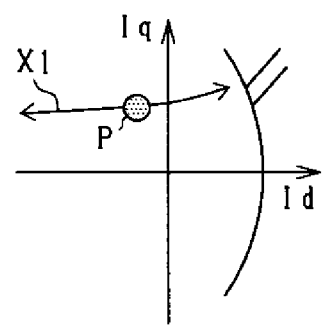

As shown in FIG. 12(c), the ripple current superimposing part 51c specifies an equivalent torque curve X1 based on the d axis current base instruction value and the q axis current base instruction value. The ripple current superimposing part 51c sweeps the operation point of the motor 40 (at a constant speed) on the equivalent torque curve X1 based on the motor ripple current frequency instruction value and the motor ripple current amplitude instruction value. The operation point of the motor 40 represents a point determined based on the d axis current and the q axis current.

Specifically, the ripple current superimposing part 51c determines a movement range of the operation point on the equivalent torque curve X1 based on the motor ripple current amplitude instruction value. At this time, the ripple current superimposing part 51c determines the movement range of the operation point while considering the allowable setting range of the d axis current and the q axis current determined by the current range setting part 51b. The ripple current superimposing part 51c determines a period (speed) of a reciprocating movement in the determined movement range of the operation point based on the motor ripple current frequency instruction value.

The ripple current superimposing part 51c determines the d axis current instruction value Id* and the q axis current instruction value Iq* based on the operation point in the movement range, and transmits the determined d axis current instruction value Id* and the q axis current instruction value Iq* to the respective comparators 52 and 53. Because the process after the transmission to the comparators 52 and 53 by the ripple current superimposing part 51c is the same as the drive control of the motor 40 previously described, the explanation of the same process is omitted here for brevity.

Accordingly, the inverter 30 superimposes the higher harmonic wave on the alternating current power, and provides the direct current power corresponding to the alternating current power to the battery 10 through the smoothing capacitor 31 and the motor 40. This control allows the battery current to contain a desired ripple current. This control makes it possible to increase the power consumption of the battery 10 because the frequency and amplitude of this ripple current has been determined while considering the frequency characteristics of the battery current and the internal resistance frequency characteristics of the battery 10.

The controller 50 performing the temperature rise control according to the present disclosure previously described provides the following effects.

(1) The present disclosure provides the structure using a ripple current (reactive current) flowing between the smoothing capacitor 31 and the battery 10 through the inverter 30. It can be recognized that the magnitude of the battery current varies according to the ripple frequency based on the characteristics of the circuit composed of the inverter 30, the smoothing capacitor 31 and the windings 41 when the temperature of the battery 10 is raised. In the present disclosure, the controller 50 determines the ripple frequency based on the battery current map I(f) representing the battery current characteristics estimated by the battery current characteristics estimation part 62 in the controller 50, and performs the switching control so as to generate the ripple current having the determined ripple frequency. Accordingly, this structure makes it possible to determine the optimum ripple frequency so as to increase the ripple current while considering the circuit characteristics. This control makes it possible to enhance the battery temperature rise capability. In addition, because the controller according to the present disclosure uses the motor 40, the inverter 30 and the smoothing capacitor 31, this makes it possible to miniaturize the overall size of the controller when compared with a controller having additional circuits.

(2) The battery current map output part 62a stores the battery current maps I(f) representing the frequency characteristics of the battery current every combination of the motor torque and the rotational speed of the motor. The battery current characteristics estimation part 62 estimates the battery current map I(f) corresponding to the combination of the current motor torque and the current rotational speed of the motor while referring a plurality of the battery current maps I(f) obtained from the battery current map output part 62a. Specifically, the battery current characteristics calculation part 62b in the battery current characteristics estimation part 62 performs the two-dimensional linear interpolation of the plurality of the battery current maps I(f), and generates the battery current map I(f) closest to the combination of the current motor torque and the current rotational speed of the motor.

The controller having the structure previously described makes it possible to determine the optimum ripple frequency while considering the operation state of the motor 40. That is, this control makes it possible to determine the optimum ripple frequency while considering the operational state of the motor even if the frequency characteristics of the battery current vary according to the combination of the motor torque and the rotational speed of the motor.

(3) The power consumption of the battery is determined based on the internal resistance and the battery current of the battery 10. The controller 50 has the battery internal resistance characteristics estimation part 61 for estimating the internal resistance of the battery 10, generating the battery internal resistance map R(f) representing the internal resistance frequency characteristics of the battery 10, and transmitting the generated battery internal resistance map R(f). The ripple current instruction control part 63 estimates the power consumption characteristics map P(f) representing the relationship between the ripple frequency and the power consumption based on the battery current map I(f) and the battery internal resistance map R(f). The ripple current instruction control part 63 determines the ripple frequency based on the power consumption characteristics map P(f). This makes it possible to determine the optimum ripple frequency.

(4) The ripple current instruction control part 63 specifies the ripple frequency range for increasing the power consumption, as compared when the ripple frequency is at least zero, based on the power consumption characteristics maps P(f). Further, the ripple current instruction control part 63 specifies the ripple frequency range based on the power consumption characteristics maps P(f) so as to have the power consumption greater than the power consumption when the ripple frequency is zero, and determines the ripple frequency in the specified ripple frequency range. This control makes it possible to have the power consumption greater than the power consumption at least when the ripple frequency is zero, i.e., when a direct current flows.

(5) The ripple current instruction control part 63 determines the ripple frequency based on the power consumption characteristics maps P(f) so as to cause the maximum power consumption. This control makes it possible to enhance the temperature rise capability so as to have the maximum power consumption.

(6) The present disclosure recognizes that the internal resistance frequency characteristics of the battery 10 varies according to the combination of the SOC (state of charge) of the battery 10 and the temperature of the battery (battery temperature). The controller 50 is equipped with the battery internal resistance map output part 61a for storing the battery internal resistance maps R(f) representing the internal resistance frequency characteristics of the battery 10 for every combination of the SOC and the temperature of the battery 10. The battery internal resistance map output part 61a transmits a plurality of the battery internal resistance maps R(f) in response to the specified combination of the SOC and the battery temperature.

The battery internal resistance characteristics estimation part 61 estimates the battery internal resistance map R(f) corresponding to the combination of the current SOC of the battery 10 and the current temperature of the battery 10 while referring to a plurality of the battery internal resistance maps R(f). Specifically, the internal resistance characteristics calculation part 61b in the battery internal resistance characteristics estimation part 61 performs the two-dimensional linear interpolation of the plurality of the battery internal resistance maps R(f), and estimates the battery internal resistance map R(f) closest to the combination of the current SOC of the battery 10 and the current temperature of the battery 10. The ripple current instruction control part 63 generates the power consumption characteristics map P(f) based on the battery current map I(f) and the battery internal resistance map R(f). This makes it possible to determine the optimum ripple frequency while considering the state of the battery 10.

(7) The ripple current superimposing part 51c specifies the equivalent torque curve X1 so as to transmit the equivalent torque based on the d axis current base instruction value and the q axis current base instruction value. Further, the ripple current superimposing part 51c determines the operation point P on the equivalent torque curve X1 based on the ripple frequency and the amplitude of the ripple current. Specifically, the ripple current superimposing part 51c determines the movement range of the operation point, in which the operation point moves in reciprocating movement on the equivalent torque curve X1 based on the amplitude of the ripple current. Further, the ripple current superimposing part 51c determines the reciprocating speed of the operation point P on the equivalent torque curve X1 based on the ripple frequency. The ripple current superimposing part 51c moves the operation point P in reciprocating movement on the equivalent torque curve X1 based on these determined results. This control allows a higher harmonic wave to be superimposed on the alternating current power converted by the inverter 30.

As previously described, on generating the ripple current, because the ripple current superimposing part 51c determines the operation point P, to be used for determining the d axis current base instruction value Id* and the q axis current base instruction value Iq* on the equivalent torque curve X1 satisfying the torque request, this control makes it possible to prevent the torque from varying due to the superimposing of the ripple current, and possible to enhance the temperature rise capability of the battery during the vehicle travel.

(8) The ripple current instruction control part 63 determines the ripple frequency so that the integer order component of the basic wave frequency of the motor 40 does not equal to the ripple frequency based on the rotational speed of the motor. In more detail, the frequency limitation setting part 63b determines the limit range of the ripple frequency so that the setting range of the ripple frequency does not contain the integer order component of the basic wave frequency of the motor 40. This control makes it possible to suppress the amplitude of the ripple current from increasing more than expected, and to present large noise from occurring due to the coincidence between the integer order component of the basic wave frequency of the rotating electric machine.

(9) The ripple current instruction control part 63 determines the upper limit value of the ripple frequency so that noise becomes not more than a predetermined limit level. In more detail, the frequency limitation setting part 63b ripple current instruction control part 63 determines the limit range based on the upper limit value of the ripple frequency so that noise of the motor 40 and the inverter 30 becomes not more than the predetermined limit level.

(10) The ripple current instruction control part 63 determines the lower limit of the ripple frequency so as to suppress the battery 10 from being deteriorated. In more detail, the frequency limitation setting part 63b determines the limit range of the ripple frequency based on the lower limit of the ripple frequency in order to avoid lithium from being deposited in a lithium-ion battery as the battery 10 when the ripple frequency is very low at a very low temperature. This control makes it possible to suppress the battery 10 from being deteriorated.

Modifications of the Embodiment Previously Described

It is acceptable to modify a part of the structure of the present disclosure previously described. Hereinafter, a description will be given of the modifications of the present disclosure.

In the embodiment previously described, the ripple current instruction control part 63 generates the power consumption characteristics map P(f) based on the battery current map I(f) and the battery internal resistance map R(f), and determines the ripple frequency based on the power consumption characteristics map P(f). In a modification of the present disclosure, it is acceptable for the ripple current instruction control part 63 to determine the ripple frequency based on the battery current map I(f) so as to have a large battery current of more than the battery current when the ripple frequency is zero. This also makes it possible to increase the power consumption by a simple process.

In the embodiment previously described, it is acceptable to calculate the resonance frequency, and to determine the ripple frequency based on the resonance frequency. In more detail, the ripple current can resonate between the smoothing capacitor 31 and the battery 10, as previously described, and it is possible to calculate the resonance frequency (hereinafter, also referred to as a wiring resonance frequency Fb2) by using the equation (2). Further, it is possible for the ripple current to resonate between the wiring 41 of the motor 40 and the smoothing capacitor 31. It is possible to calculate this resonance frequency (hereinafter, also referred to as a motor resonance frequency Fb1) by using the equation (7).

It is acceptable for the controller 50 to calculate one of those resonance frequencies Fb1 and Fb2, and to determine the ripple frequency based on the calculated resonance frequency. It is also possible for the controller 50 to calculate those resonance frequencies Fb1 and Fb2, and to specify the ripple frequency based on the calculated resonance frequency capable for more increasing the magnitude of the battery current.

As previously described, when the ripple frequency is used as the predetermined resonance frequency, it is possible to resonate the ripple current between the motor 40 and the smoothing capacitor 31, or between the battery 10 and the smoothing capacitor 31. This control makes it possible to increase the power consumption because the battery current increases. It is thereby possible to increase the power consumption, and for the battery to have the enhanced temperature rise capability.

Figure 13:
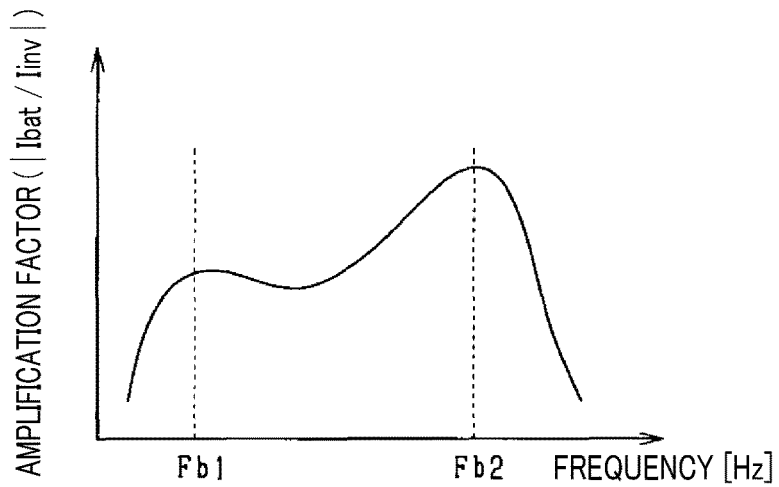
FIG. 13 is a view explaining a relationship between a resonance frequency and an amplification rate.

As shown in FIG. 13, in general, an amplitude rate (of the battery current) moderately and easily increases between the resonance frequency FB1 and the resonance frequency Fb2. Accordingly, it is also acceptable for the controller 50 to calculate those resonance frequencies FB1 and Fb2, and to determine the ripple frequency within the frequency range between the resonance frequency FB1 and the resonance frequency Fb2. In this modification, it is desirable for the controller to determine the optimum ripple frequency within the frequency range between the resonance frequency FB1 and the resonance frequency Fb2 while considering the limit range of the ripple frequency and the upper limit power consumption, similar to the embodiment previously described.

In the embodiment previously described, the battery current map I(f) is estimated for every combination of the motor torque and the rotational speed of the motor. However, it is not necessary to estimate the battery current maps I(f) in accordance with the combination of the motor torque and the rotational speed of the motor. This makes it possible to determine and store one type of the battery current maps I(f). This can save the cost and time in manufacturing.

In the embodiment previously described, plural battery current maps I(f) are stored. However, it is enough to store only one type of the battery current map I(f). In this case, it is sufficient to estimate a battery current map I(f) in accordance with the combination of the motor torque and the rotational speed of the motor based on the stored battery current map I(f).

In the embodiment previously described, it is acceptable for the controller to update the battery current map I(f). For example, it is acceptable for the controller 50 to have an updating part for updating the battery current map I(f). This updating part obtains the frequency characteristics of the battery current while gradually varying the ripple frequency of the ripple current to be generated during a predetermined period of time. This makes it possible to obtain more precise frequency characteristics of the battery current in accordance with the vehicle condition, and to determine the optimum ripple frequency. It is acceptable to determine the predetermined period of time during the period of the temperature rise control, or during the period without temperature rise control.

The embodiment previously described estimates a plurality of the battery internal resistance maps R(f) in accordance with every combination of the SOC of the battery 10 and the temperature of the battery 10. However, it is acceptable to change the battery internal resistance maps R(f) without considering the combination of the SOC of the battery 10 and the temperature of the battery 10. This makes it possible to use and store one type of the battery internal resistance maps R(f). This saves the cost and time in manufacturing.

In the embodiment previously described, a plurality of the battery internal resistance maps R(f) is stored. However, it is acceptable to store only one type of the battery internal resistance maps R(f). In this case, it is acceptable for a modification of the embodiment to estimate the battery internal resistance map R(f) in accordance with a combination of the SOC of the battery and the temperature of the battery based on one type of the battery internal resistance maps R(f).

In the embodiment previously described, it is acceptable for the BMU 20 to estimate the internal resistance of the battery, and acceptable for the controller 50 to estimate the power consumption characteristics map P(f) based on the internal resistance and the battery current map I(f).

In the embodiment previously described, the ripple current is generated while performing the reciprocating movement of the operation point P on the equivalent torque curve X1. However, it is sufficient not to move the operation point on the equivalent torque curve X1 so long as the ripple current can be generated.

In the embodiment previously described, it is acceptable for the controller 50 to generate the ripple current by sweeping the carrier frequency of the inverter 30 based on the ripple frequency and the amplitude of the ripple current. This makes it possible for the controller to easily generate the ripple current.

Figure 14:
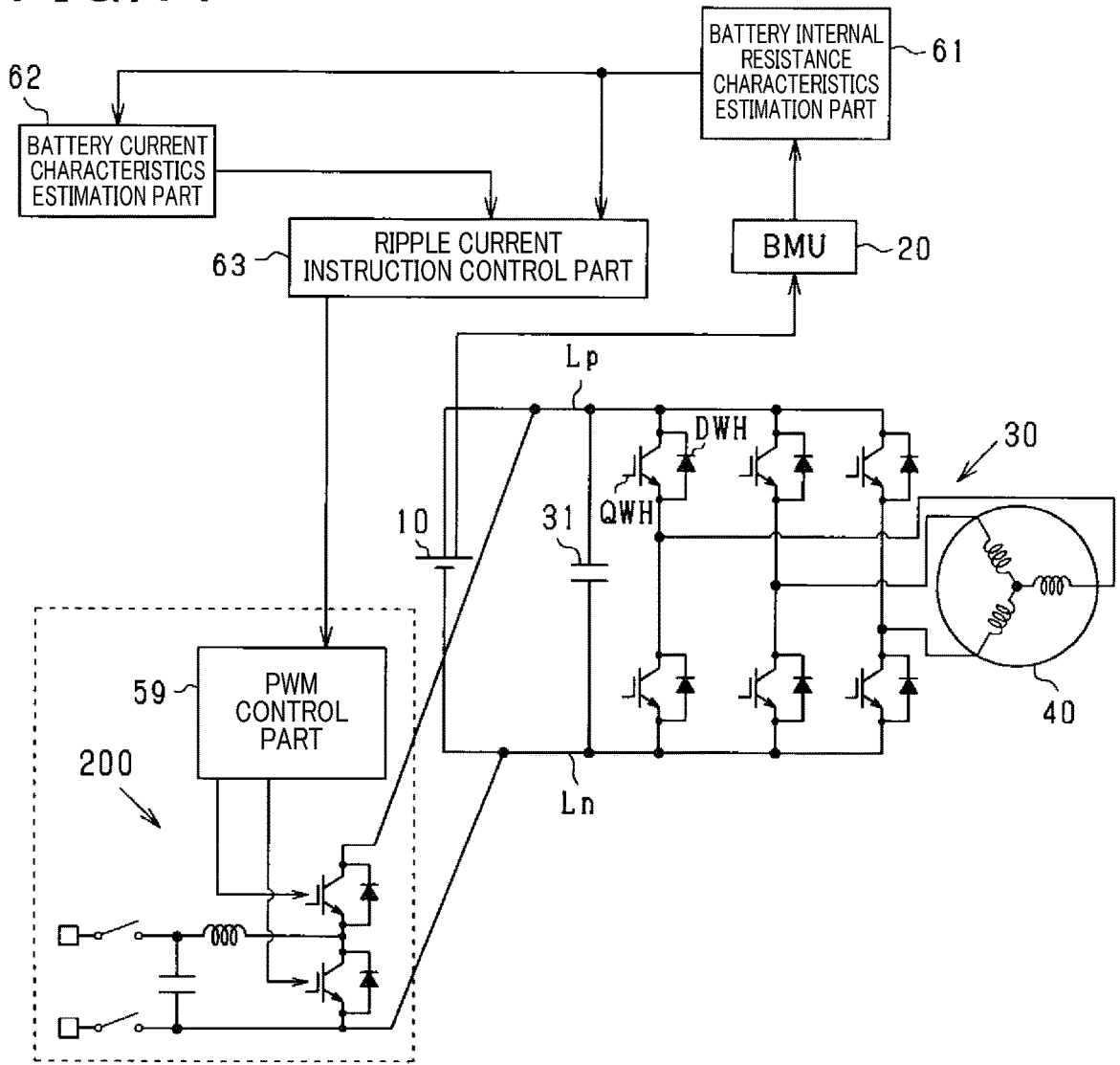
FIG. 14 is a configuration diagram of a drive system according to the modification of the present disclosure.

In the embodiment previously described, a charging circuit 200 shown in FIG. 14 is connected to a positive electrode line Lp and a negative electrode line Ln, where the charging circuit 200 is equipped with a capacitor, a coil and series-connected units, and each of the series-connected units is composed of an upper arm side switching part and a lower arm side switching part. In this modification, it is possible for the controller 50 to generate the ripple current by using the charging circuit 200 instead of using the inverter 30, or by using both the charging circuit 200 and the inverter 30. In this case, it is acceptable for the PWM control part 59 to generate the ripple current while sweeping the carrier frequency of the charging circuit 200 based on the ripple frequency and the amplitude of the ripple current.

Figure 15:
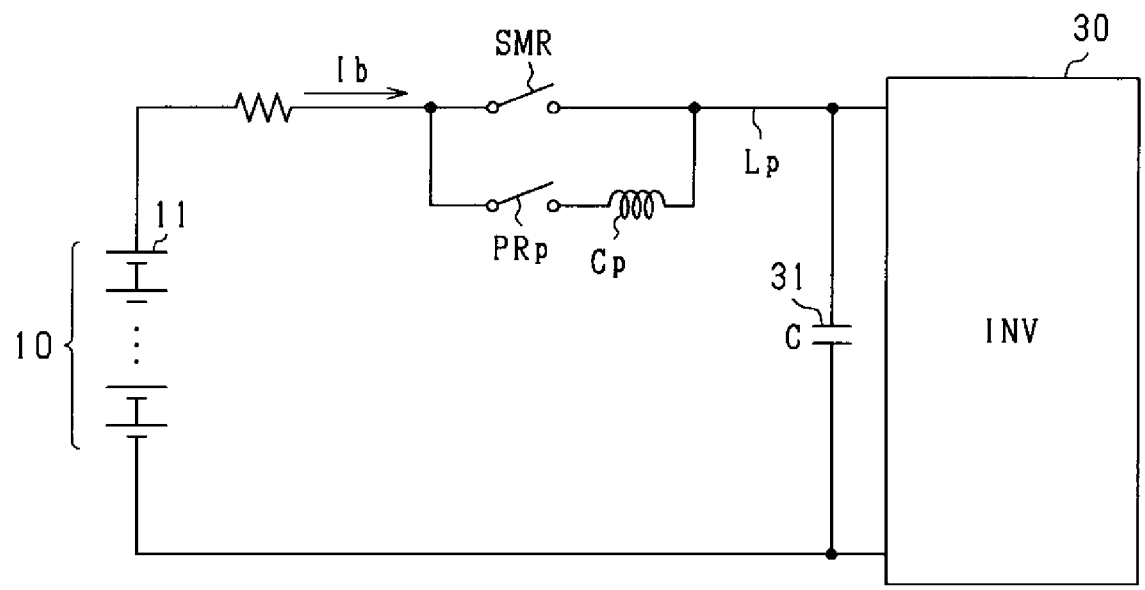
FIG. 15 is another configuration diagram of the drive system according a modification of the present disclosure.

In the embodiment previously described, it is acceptable to increase the ripple current by using a rush current prevention coil Cp when the rush current prevention coil Cp is arranged between the battery 10 and the smoothing capacitor 31, as shown in FIG. 15. In more detail, as shown in FIG. 15, a main relay SMR is arranged on the positive electrode line Lp between the battery 10 and the smoothing capacitor 31. The main relay SMR is connected in parallel with a series-connected unit composed of a pre-charge relay PRp and the rush current prevention coil Cp. In this circuit structure, it is possible for the controller 50 to turn off the main relay SMR, and to turn on the pre-charge relay PRp so as to cause the battery current to flow through the rush current prevention coil Cp.

Figure 16:
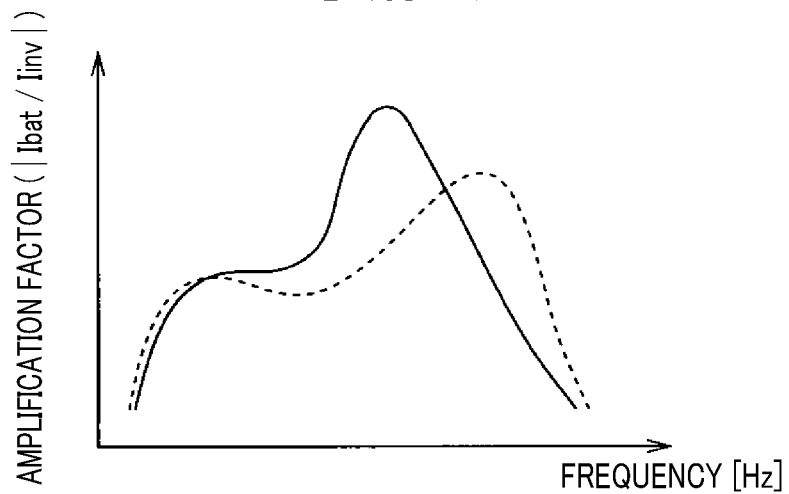
FIG. 16 is a view explaining a relationship between the resonance frequency and the amplification rate according the modification of the present disclosure.

As shown in FIG. 16, this control makes it possible to add the inductance value of the rush current prevention coil Cp to the battery current, and thereby to increase the amplitude of the ripple current superimposed on the battery current. This makes it possible to reduce the ripple frequency, and to increase the power consumption of the battery. As shown in FIG. 16, the dotted line indicates an image of the amplification factor when the main relay SMR is turned on, and the solid line indicates an image of the amplification factor when the pre-charge relay PRp is turned on.

The embodiment previously described uses the upper limit and the lower limit of the ripple frequency. However, it is acceptable to use the ripple frequency without using any upper limit and lower limit. The embodiment previously described performs the control so that an integer order component of the basic wave frequency of the motor 40 does not coincide with the ripple frequency based on the rotational speed of the motor. However, it is possible to perform the control so that the integer order component of the basic wave frequency of the motor 40 coincides with the ripple frequency based on the rotational speed of the motor.

In the embodiment previously described, it is acceptable to perform the temperature rise control of the battery 10 regardless of whether the vehicle is running or stops before the start of charging of the battery 10. The temperature rise control performed before the start of charging of the battery 10 makes it possible to increase the upper limit of the input power of the battery 10, and to reduce the charging period of time.

In the embodiment previously described, it is acceptable to adjust at any time the power to be used for the temperature rise control, as compared with the input power of the battery 10. This control makes it possible to reduce the charging time of the battery 10.

While specific embodiments of the present disclosure have been described in detail, the concept of the present disclosure is not limited by the embodiments and the modifications previously described. It will be appreciated by those skilled in the art that various modifications and alternatives to those details could be developed in light of the overall teachings of the disclosure. Accordingly, the particular arrangements disclosed are meant to be illustrative only and not limited to the scope of the present disclosure which is to be given the full breadth of the following claims and all equivalents thereof.

What is claimed is:

1. A controller for a power converter, comprising a frequency characteristics estimation part,
    a ripple current setting part, and a control part, wherein
    the power convertor comprises a power conversion unit and a capacitor, the power conversion unit comprises series-connected units, each of the series-connected units is composed of an upper arm side switching element and a lower arm side switching element, and the power conversion unit performs a switching control for converting a direct current power supplied from a battery to an alternating current power, and supplies the alternating current power to a rotating electric machine having windings, and the capacitor is connected in parallel with the series-connected unit, wherein
    the frequency characteristics estimation part estimates frequency characteristics of a battery current flowing in the battery when a current is flowing between the power convertor and the battery,
    the ripple current setting part determines a ripple frequency of a ripple current contained in the battery current based on the frequency characteristics of the battery current, and
    the control part performs the switching control of the upper arm side switching element and the lower arm side switching element based on the ripple frequency of the ripple current determined by the ripple current setting part so as to generate the ripple current.

2. The controller for the power converter according to claim 1, wherein the ripple current setting part determines a frequency range based on at least one of a resonance frequency between the windings of the rotating electric machine and the capacitor and a resonance frequency between the battery and the capacitor, and the ripple current setting part determines the ripple frequency of the ripple current within the determined frequency range.

3. The controller for the power converter according to claim 2, wherein
the ripple current setting part determines a frequency range within the resonance frequency between the capacitor and the windings of the rotating electric machine, and within the resonance frequency between the battery and the capacitor, and the ripple current setting part determines the ripple frequency of the ripple current within the determined frequency range.

4. The controller for the power converter according claim 1, wherein the frequency characteristics estimation part comprises a current map storage part and a current characteristics calculation part, the current map storage part stores current maps, representing frequency characteristics of the battery current, for every combination of a torque and a rotational speed of the rotating electric machine, and the current characteristics calculation part estimates the frequency characteristics of the battery current corresponding to a combination of the torque and the rotational speed of the rotating electric machine while referring to the current maps stored in the current map storage part.

5. The controller for the power converter according to claim 1, wherein
the frequency characteristics estimation part comprises a current map storage part, an updating part and a current characteristics calculation part, the current map storage part stores current maps, representing frequency characteristics of the battery current, the updating part obtains the frequency characteristics of the battery current while varying the ripple frequency of the ripple current to be generated during a predetermined period of time, and the updating part updates the current maps, and the current characteristics calculation part estimates the frequency characteristics of the battery current corresponding to a combination of the torque and the rotational speed of the rotating electric machine while referring the current maps stored in the current map storage part.

6. The controller for the power converter according to claim 1, further comprises an internal resistance estimation part estimating an internal resistance of the battery, wherein
the ripple current setting part estimates a relationship between the ripple frequency and the power consumption of the battery based on the frequency characteristics of the battery current estimated by the frequency characteristics estimation part and the internal resistance of the battery estimated by the internal resistance estimation part, and the ripple current setting part determines the ripple frequency based on the estimated relationship between the ripple frequency and the power consumption of the battery.

7. The controller for the power converter according to claim 6, wherein
the ripple current setting part specifies the frequency range of the ripple current based on the relationship between the ripple frequency and the power consumption characteristics of the battery, so as to have the power consumption greater than the power consumption at least when the ripple frequency is zero, and the ripple current setting part determines the ripple frequency in the specified ripple frequency range.

8. The controller for the power converter according to claim 6, wherein
the ripple current setting part determines the ripple frequency of the ripple current based on the ripple frequency and the power consumption characteristics of the battery so as to have the maximum power consumption.

9. The controller for the power converter according to claim 6, wherein
the internal resistance estimation part comprises an internal resistance map storage part and an internal resistance characteristics calculation part, where the internal resistance map storage part stores internal resistance maps representing an internal resistance frequency characteristics of the battery for every combination of a state of charge of the battery and a temperature of the battery, and the internal resistance characteristics calculation part estimates the internal resistance frequency characteristics of the battery in accordance with a combination of the state of charge of the battery and the temperature of the battery while referring to the internal resistance characteristics maps stored in the internal resistance map storage part, and
the ripple current setting part specifies the relationship between the ripple frequency and the power consumption of the battery based on the frequency characteristics of the battery current and the internal resistance frequency characteristics of the battery.

10. The controller for the power converter according to claim 1, wherein
the control part comprises an axis current instruction part, a current superimposing part and a switch control part, and the axis current instruction part instructs a d axis current base instruction value and a q axis current base instruction value based on the torque value of the rotating electric machine, the d axis current base instruction value instructs a d axis current of the rotating electric machine, and the q axis current base instruction value instructs a q axis current of the rotating electric machine, and the torque instruction value instructs a torque of the rotating electric machine, and
the current superimposing part specifies an equivalent torque curve so as to output an equivalent torque, based on the d axis current base instruction value and the q axis current base instruction value, and the current superimposing part determines an operation point on the equivalent torque curve based on the ripple frequency and the amplitude of the ripple current, and determines a d axis current instruction value and a q axis current instruction value based on the determined operation point,
the switch control part performs the switching control based on the d axis current instruction value and the q axis current instruction value, wherein
the current superimposing part determines a range of the operation point in reciprocating movement on the equivalent torque curve based on the amplitude of the ripple current and determines a movement speed of the operation point in reciprocating movement on the equivalent torque curve based on the ripple frequency, and moves the operation point in reciprocating movement on the equivalent torque curve so as to generate the ripple current.

11. The controller for the power converter according to claim 1, wherein
the power converter is an inverter, and the control part generates the ripple current by sweeping a carrier frequency of the inverter based on the ripple frequency and the amplitude of the ripple current.

12. The controller for the power converter according to claim 1, wherein
the controller is connected to a charging circuit equipped with a capacitor, a coil and a series-connected unit composed of an upper arm side switching part and a lower arm side switching part, and the controller generates the ripple current by sweeping the carrier frequency of the charging circuit based on the ripple frequency and the amplitude of the ripple current.

13. The controller for the power converter according to claim 1, wherein
the battery is connected to the power converter through a main relay, the main relay is connected to a series-connected unit composed of a pre-charge relay and a rush current prevention coil, and
when the ripple current is generated, the control part turns off the main relay and turns on the pre-charge relay at the generation of the ripple current so as to cause the battery current to flow through the rush current prevention coil.

14. The controller for the power converter according to claim 1, wherein
the ripple current setting part determines the ripple frequency so that an integer order component of a basic wave frequency of the rotating electric machine does not coincide with the ripple frequency based on the rotational speed of the rotating electric machine.

15. The controller for the power converter according to claim 1, wherein
the ripple current setting part determines an upper limit value of the ripple frequency so that a magnitude of noise is not more than a predetermined limit level.

16. The controller for the power converter according to claim 1, wherein
the ripple current setting part determines a lower limit value of the ripple frequency so as to suppress the battery from deteriorating.

17. The controller for the power converter according to claim 1, wherein
the power converter and the controller are mounted on a vehicle, and the controller is configured to generate the ripple current during the vehicle running.

18. The controller for the power converter according to claim 1, wherein
the power converter and the controller are mounted on a vehicle, and the controller is configured to generate the ripple current before vehicle start.

* * * * *